July 10, 1945.  J. R. HICKS  2,380,177
NULL-TYPE FLUID MANOMETER SYSTEM
Filed Oct. 8, 1942  2 Sheets-Sheet 1

INVENTOR.
James R. Hicks
BY
E. C. Sanborn
Attorney

July 10, 1945.   J. R. HICKS   2,380,177
NULL-TYPE FLUID MANOMETER SYSTEM
Filed Oct. 8, 1942   2 Sheets-Sheet 2

INVENTOR.
James R. Hicks
BY E. C. Sanborn
Attorney

Patented July 10, 1945

2,380,177

UNITED STATES PATENT OFFICE 2,380,177

NULL-TYPE FLUID MANOMETER SYSTEM

James R. Hicks, Waterbury, Conn., assignor to The Bristol Company, Waterbury, Conn., a corporation of Connecticut Application October 8, 1942, Serial No. 461,312

15 Claims. (Cl. 73—205)

This invention relates to manometer systems of the null or balancing type, especially to a differential manometer system of the U-tube class operating upon the null principle wherein the net displacement of the measuring fluid is reduced to zero.

In the measurement of fluid pressure differentials, or, specifically, in the determination of rate of flow by the use of a U-tube manometer actuated by the pressure differential developed across an orifice or a Venturi tube, or the like, it is customary to make use of mercury as a measuring liquid. Where the measurement is based upon the displacement of a certain portion of the contained mercury in response to changes in the pressure differential, it is necessary that there be used a sufficient quantity of the mercury to enable all significant parts of the U-tube systems to be properly filled at all pressure values within the range of the instrument. The necessity for providing sufficient mercury to insure such filling of the U-tube system requires a disproportionately large amount of the liquid, with an attendant correspondingly high cost.

The displacement of a large volume of the manometer liquid, when used in conjunction with corrosive fluids or in any instance where segregation of the manometer liquid and the measured fluid is necessary, requires elaborate sealing means whether of the liquid or resilient type; and such devices not only represent added expense in the construction of the instrument, but are in themselves sources of error. A further objection to the use of the displacement principle in such a device is found in the need for a packing gland or stuffing box whereby there may be transmitted through the case of the instrument a mechanical movement representative of the total range of deflection.

It is an object of this invention to provide a manometer system suited to the purpose of flow measurement and in which the amount of liquid displaced at any time shall be a minimum, and in which the net displacement corresponding to the range of operation shall be zero.

It is a further object to provide apparatus of the above nature in which the mechanical motion to be transmitted through the casing thereof shall be of minimum magnitude.

It is a further object to provide apparatus of the above nature in which, by the utilization of a servomotor, the measuring pointer, index, or other exhibiting devices will be moved with sufficient force to operate recording, integrating, or controlling instrumentalities.

It is a further object to provide a device of the above nature in which compensation for the inherently non-linear characteristic of orifices, Venturi tubes, or the like, may readily be effected; and in which, with a minimum of structural change, such compensation may be adapted to any predetermined law of response.

It is proposed to provide a manometer of the U-tube class having two reservoirs, of which one shall be fixed and the other vertically movable, and a flexible connection between said reservoirs whereby the bodies of liquid contained therein may be maintained in constant communication. It is further proposed to provide auxiliary mechanism in the form of a servomotor adapted to adjust the vertical position of the movable reservoir in response to changes in the level of the surface of the liquid in the fixed reservoir in such a sense as to offset pressure changes responsible for said variations in level. It is further proposed to include in said servomotor mechanism a readily removable and replaceable cam or the like adapted to introduce between the motion of the adjustable reservoir and that of the element whereby the measurement is exhibited a proportionality which will compensate for the inherent characteristic of the orifice or other flow measuring member then in use, and cause the deflection of the exhibiting member to bear a uniformly proportional relationship to the magnitude under measurement.

Figure 3:
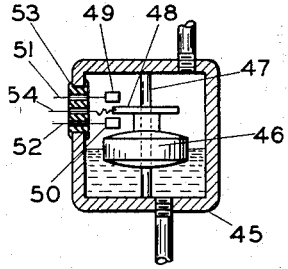
Figs. 2 and 3 are sectional representations of alternative forms of certain parts of the flowmeter mechanism.

Referring now to the drawings, the numeral 10 designates a base plate or mounting frame adapted to support in operative relationship the various elements of the mechanism. Fixedly mounted upon a pedestal forming a part of the frame 10 is a reservoir 11 having openings at the top and bottom and containing a float 12 attached to the end of an arm 13 fixed to a rotatable spindle 14. The spindle 14 passes through the wall of the chamber 11 either by means of a stuffing box of the conventional type or through a flexible motion-transmitting seal such as is disclosed in United States Letters Patent Number 1,827,560, issued to G. S. Binckley, October 13, 1931. Thus, motion of said arm in swinging through a limited angle with movement of the float 12 may impart corresponding angular deflection to the spindle 14 without appreciable restriction of said movement. Carried by the spindle 14 exteriorly to the reservoir 11 is an insulated electric contact member 15 whose function will hereinafter be set forth.

Slidably mounted upon vertical guide bars 16 and 17 carried by the base 10 and supported by a spring member 18 is a second reservoir 19 having openings at the top and bottom. The bottom openings of the reservoirs 11 and 19 are connected by a conduit 20 having at least a portion formed of flexible material such as metal hose, whereby the interior spaces of said reservoirs will be placed in direct communication so that a body of mercury or similar fluid placed therein will tend to have its surfaces in the two reservoirs maintained at a common level when said surfaces are subjected to equal static pressures.

Journaled in a bearing member 21 carried by the guide bars 16 and 17 is a horizontally disposed shaft 22 carrying a cam member 23 adapted to engage the upper surface of the reservoir 19 in a sense to move said reservoir vertically against the influence of the spring member 18 upon rotation of the shaft 22 through a limited angle. Fixed to the shaft 22 is a worm wheel 24 whereby said shaft may be rotated. A reversible electric motor 25 carried by an extended portion of the bearing member 21 is adapted to rotate the shaft 22 through the agency of a worm 26 carried by a shaft 27 connected to said motor. An index or pointer 28, fixed to the shaft 22 and rotatable therewith, provides by its indication on a suitably placed graduated scale 29 a measure of the angular position of the shaft 22, and therefore of the vertical position of the reservoir 19. The cam member 23 may have its contour conformed to any desired predetermined law, whereby the vertical displacement of the reservoir 19 may be caused to bear any desired relationship to the angle displacement of the pointer or index 28.

Electrical contacts 30 and 31 connected to the wiring of the motor 25 and juxtaposed for operative engagement with the contact 15, when suitably connected to a source of electric power supply 32, provide for reversible operation of said motor in a direction according to whether contact 15 engages contact 30 or 31, and in a manner well known in the field of automatic control.

The manometer embodying the principles of the invention is shown operatively connected for the determination of fluid flow in a pipe line or conduit 35. Included in said conduit is an orifice plate 36, and from the pipe line on the respective sides of the orifice plate are tapped conduits 37 and 38, the former being connected on the "downstream," and the latter to the "upstream" side of the orifice plate 36. The conduit 37 is directly connected to the opening in the top of reservoir 11; and the conduit 38 is connected to the opening of the upper part of the reservoir 19 through the medium of a section of flexible hose or the like 39 to allow for free vertical movement of the reservoir 19. A heavy liquid such as mercury, is placed within the U-tube system formed by the reservoirs 11 and 19 and the connecting conduit 20, and adjusted to a reference level or datum line such that with equal pressures on the surfaces in the two reservoirs the float 12 will be supported in such a position that the contact 15 will not be in engagement with either of the contacts 30, 31.

In studying the operation of the device, it may first be assumed that there is no flow through the conduit 35. Under this condition there will be no pressure developed between opposite faces of the orifice plate 36, and consequently no pressure differential between the conduits 37 and 38 nor between the liquid surfaces in the reservoirs 11 and 19, so that there will be no circuit completed by the contact 15, and the motor 25 and associated mechanism will remain at rest.

Assuming now that a condition of fluid flow in the direction shown by the arrow A is produced in the conduit 35, there will be developed across the orifice plate 36 a difference of pressures, the lower of these being applied through the conduit 37 to the upper part of the reservoir 11 and the higher through the conduit 38 and the flexible section 39 to the upper part of the reservoir 19. According to principles well known in the art of pressure measurement, the surface of mercury in reservoir 19 will be depressed and that in the reservoir 11 elevated by an amount corresponding to the difference between the pressures applied to said surfaces through the conduits 38 and 37 respectively. Upon elevation of the surface of liquid in reservoir 11 the float 12 will be raised by a corresponding amount, acting through the arm 13 to rotate the spindle 14, and thereby bringing the contacts 15 and 31 into operative electrical engagement. The connections of the motor 25 being properly arranged, said motor will operate and will rotate the shaft 27 and the worm 26 in a direction to cause the worm wheel 24 and the shaft 22 to be rotated in a clockwise sense as shown in the drawings. The cam 23 rotating with the shaft 22, will act upon the upper part of the movable reservoir 19 to depress it vertically in oppositilon to the influence of the spring 18. The lowering of the reservoir 19 together with the liquid contained therein will cause the liquid which at first flowed into the reservoir 11 to return to the reservoir 19 with a corresponding tendency to restore the surface of the liquid in reservoir 11 to its original level. This operation will continue until said original level is attained, whereupon the float 12, acting through the arm 13 into the spindle 14, will separate the contacts 15 and 31 and cause the motor 25 and the mechanism driven thereby to come to rest. In the event of an increase in the rate of flow through the conduit 35, the differential pressure between conduits 38 and 37 will be increased, with a further depression of the liquid in reservoir 19 and elevation of that in the reservoir 11, again closing contacts 15 and 31 and causing the motor 25 to rotate the cam 23 to depress the reservoir 19 and restore equilibrium. In a similar manner, a reduction in the rate of flow will act to cause the contact 30 to be engaged by the contact 15 and the cam 23 to be rotated in a counterclockwise sense as shown in the drawings, thus elevating the reservoir 19. Thus it will be seen that for every rate of fluid flow through the conduit 35 the cam 23 will assume a definite position, which position will be indicated by the deflection of the pointer 28 with respect to the scale 29.

By suitably conforming the contour of cam 23 the vertical displacement of the reservoir 19 may be made to bear to the angular displacement of the shaft 22 any desired predetermined relationship. Thus, as shown in the example, by suitably incorporating a law of squares in the conformation of the cam 23, the characteristic relationship between rate of flow through an orifice and differential pressures developed thereby may be compensated for, and the pointer 28 caused to advance along the scale 29 in uniform increments for uniform changes of flow through the conduit 35. Should the differential pressure between the conduits 37 and 38 follow some other than a quadratic law, with respect to the magnitude of said flow rate, this law may be compensated for by replacing the quadratic cam 23 by a cam having a contour corresponding to the other law, and a uniform scale characteristic preserved.

Figure 1:
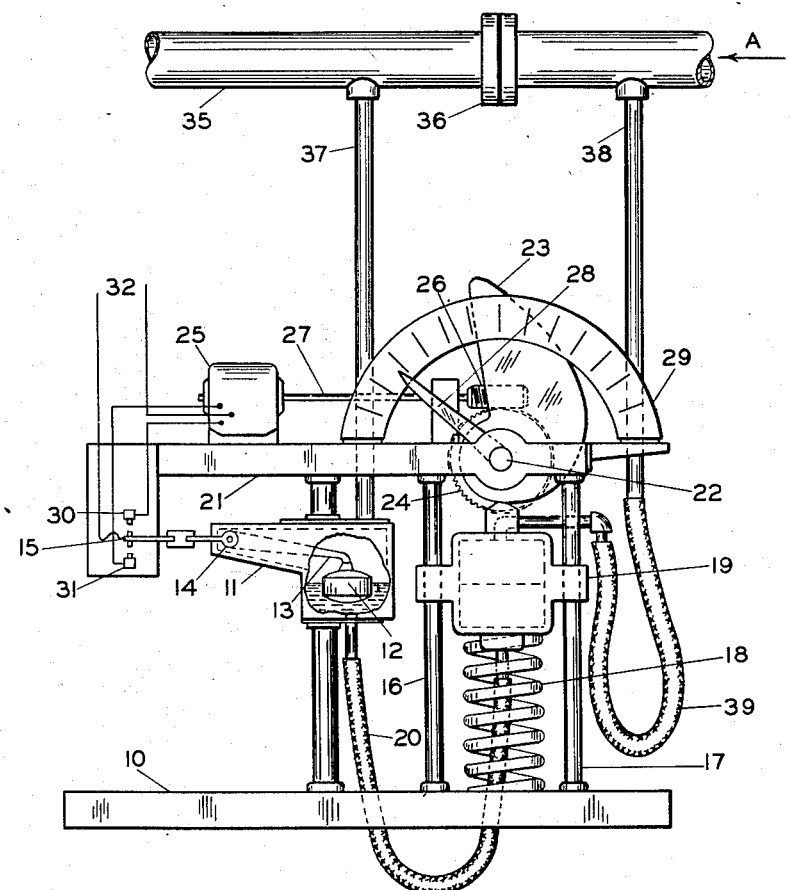
Fig. 1 is a diagrammatic representation partly in section of a flowmeter embodying the principles of the invention.
Figure 2:
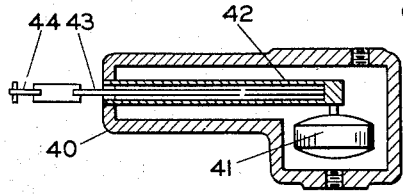

While in the embodiment in the invention as thus far set forth, the device by which motion may be transmitted from the interior to the exterior of the chamber 11 is indicated as being restricted to the transmission of rotary motion about the axis of a spindle, there may be substituted therefor a motion-transmitting seal in which the resilient member is mounted as a cantilever and is deformed by bending rather than by torsion. Such an arrangement is shown in Fig. 2 wherein a reservoir 40 generally similar to the reservoir 11 in Fig. 1 has therein a float member 41 carried on the end of an inwardly projecting cantilever tube 42 having a rigid rod 43 extending through the interior of said tube to the space exterior to said chamber. As the float 41 rises or falls with the level of a body of mercury or similar liquid within the reservoir 40, the tube 42 will be bent through a slight angle so that the outer end of the rod 43 will partake of corresponding rising and falling motion. An insulated contact 44 mounted upon the end of rod 43 in a manner similar to the contact 15 in Fig. 1 may be caused, in coaction with associated contacts to control a balance-restoring mechanism similar in all respects to that shown in Fig. 1. The transmission of motion from the interior of the chamber 40 to the exterior space by means of a deformable cantilever tube 42 is similar to the embodiment shown in Fig. 2 of the Binckley patent above referred to, and also to some forms of the invention set forth by O. Roschanek in United States Letters Patent No. 1,173,038, issued February 22, 1916. Motion-transmitting seals of this type, while effective in their principal function, are inherently limited to relatively small angular deflections; and because the principles set forth and claimed in the present invention require only small deflection, such seals are particularly adaptable to this form of device.

In the form of the invention shown in Fig. 3 the motion of the float is caused to actuate the contacts of the balancing mechanism without the interposition of mechanical devices for transmitting the effects of said motion to the exterior of the reservoir. A reservoir 45, connected in a manner similar to the reservoir 11 in Fig. 1, has positioned therein a float member 46, preferably of annular structure, and constrained to move only in response to changes in liquid level by means of a vertically disposed guide rod 47 extending centrally therethrough. Carried by the float member 46 is a contact element 48 adapted alternatively to engage stationary contacts 49 and 50 according to whether said float rises or falls with changes in liquid level from a predetermined intermediate datum. The contacts 49 and 50 are carried by conducting supports 51 and 52 respectively, passing through an insulating bushing 53 in the wall of the reservoir 45 and forming external terminals to which an electric circuit may be connected. The contact element 48 has connected thereto a lead 54, also passing through the bushing 53 to form an external terminal, and having a flexible portion within the reservoir providing connection to the movable contact element without restricting its motion through a limited range. The supports 51, and 52 and the lead 54 are connected in an electrical circuit in a manner identical with the contacts 30, 31, and 15 of Fig. 1, whereby a balancing mechanism may be actuated by changes in the level of a liquid in the reservoir 45, to restore said level to its original datum in a manner identical with that fully set forth in connection with the mechanism shown in Fig. 1.

Figure 4:
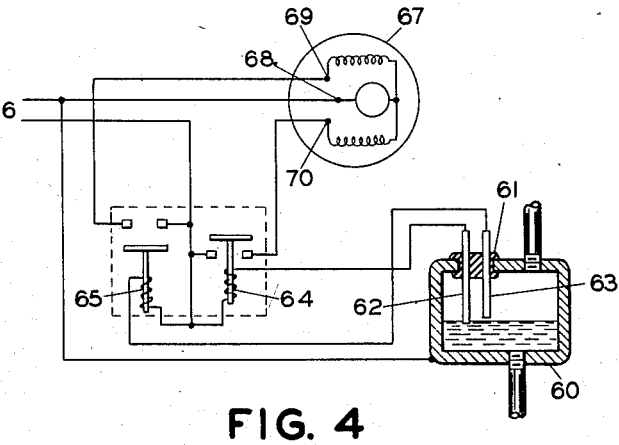
Fig. 4 is a view, partly diagrammatic and partly in section, of a further alternative form of the invention.

In Fig. 4 is shown a modification of elements of the invention whereby the use of a float in the mercury reservoir is eliminated, and the surface of the mercury itself utilized as a contacting element. A stationary reservoir 60 connected to the fluid system in a manner identical with the corresponding reservoirs 11, 40, and 45 in the preceding embodiments, is provided with an insulating bushing 61 positioned in a suitable opening in its wall, and supporting two electrodes or contacts 62 and 63 adapted to engage the surface of the mercury within the reservoir 60, and to complete electrical circuits therewith. The contacting tips of the electrodes 62 and 63 are adjusted to have a small relative vertical displacement, the tip of the electrode 62, shown, being slightly lower than that of electrode 63.

Relays 64 and 65 have one side of each of their operating coils connected to the electrodes 62 and 63 respectively. The remaining terminals of these coils are connected in common to one side of a source of electric supply 66. By means of a conductor connected to the body of the reservoir 60 the contained liquid is placed in electrical communication with the other side of said source of supply. The contacts of relay 64 are closed when said relay is de-energized while the contacts of relay 65 are open when the latter relay is de-energized. One of the contacts of relay 64 and one of the contacts of relay 65 are connected in common to one side of source 66. An electric motor 67 having mechanical connections to the balancing mechanism identical to those associated with the motor 25 in Fig. 1, has a common terminal 68 and two terminals 69 and 70 connected to the internal windings of the motor in such a manner that when electric power is applied between the terminals 69 and 68 the balancing mechanism will be operated in such a sense to lower the level of the liquid in reservoir 60, and when power is applied between the terminal 70 and 68 the mechanism will be operated to raise said level. The terminal 69 is connected to the free contact of relay 65 and terminal 70 to the free contact of relay 64.

The operation of the device in the form shown in Fig. 4 is as follows: Assuming, first, that the level of liquid in the reservoir 60 is such as to immerse the tip of the electrode 62 without touching the electrode 63, the relay 64 will be energized, causing its contacts to be open, and the relay 65 will be de-energized causing its contacts to be open. Under this condition the motor 67 will remain at rest. Assuming, now, that the level of the liquid in the reservoir rises sufficiently to touch the tip of the electrode 63, the relay 65 will be energized and will close its contacts, completing a circuit from the source 66 through the terminals 69 and 68 of the motor 67, and causing the same to operate in a direction to lower the liquid level. Upon the level of the liquid being lowered to an extent that it clears the tip of the electrode 63, the relay 65 will again be de-energized and the motor 67 brought to rest. Assuming, now, that the liquid level is lowered to an extent that it clears the tip of electrode 62, the relay 64 will be de-energized, causing its contacts to be closed and the motor 67 to operate in a sense to raise the liquid level, this operation continuing until the surface of the liquid again engages the tip of the electrode 62 causing the relay 64 to be energized and the motor 67 brought to rest.

Thus it will be seen that with the arrangement shown in Fig. 4 the motor 67 will continually strive through the associated mechanism to maintain the level of the liquid in the reservoir 60 at a predetermined height as established by the positioning of the electrodes 62 and 63. The slight difference in the vertical position of the tips of these electrodes establishes a neutral zone wherein the balancing mechanism will remain at rest; and by bringing these electrodes sufficiently close to the same level, this zone may be made of infinitesimal width. Thus there has been provided means for operating a null-type flow meter of the class under consideration without the use of a mechanical float in the reservoir of the U-tube manometer.

Figure 5:
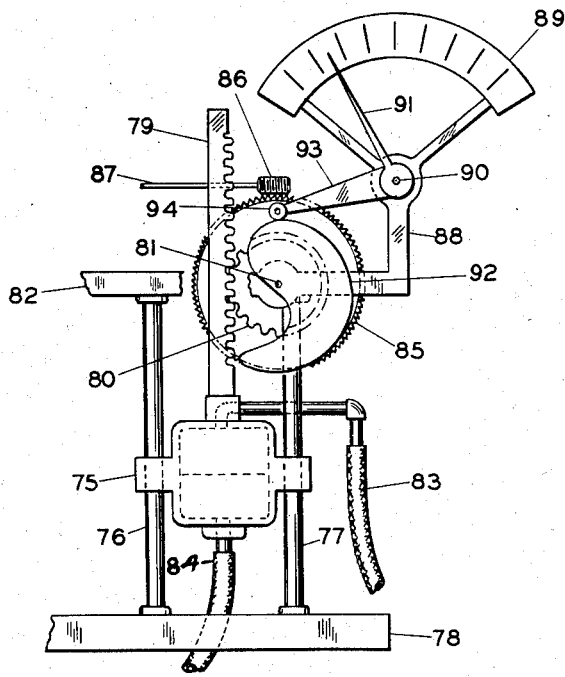
Figs. 5 and 6 illustrate further alternative forms of the invention as modified to meet special requirements.

In Fig. 5 is shown an alternative form of mechanism embodying the principles of the invention, and especially suited to applications where a relatively wide range of pressure differential values is encountered. A reservoir 75 vertically movable on guide bars 76 and 77 supported on a base plate 78 has attached thereto a rack 79 meshing with a pinion 80 carried upon a rotatable shaft 81 journaled in a bearing which forms a part of a supporting plate 82 fixed to the guide rods 76 and 77. A flexible conduit 83 provides connection between the upper part of the reservoir 75 and the high pressure side of an orifice member, not shown in the drawings. A flexible conduit 84 provides connection between the lower part of the reservoir 75 and a float chamber, not shown in the drawings, which may be of any of the types shown in Figs. 1, 2, 3, and 4, and connected to the low pressure side of the orifice member. Attached to the shaft 81 is a worm wheel 85 adapted to be driven by a worm 86 carried by a shaft 87 adapted to be reversibly driven by an electric motor not shown in the drawings. The motor, and other elements of this embodiment of the invention indicated as not shown in the drawings may be identical in their structure and assembly with the corresponding elements shown in the preceding figures of the drawings.

Mounted upon a bracket 88 attached to the plate 82 is a graduated scale 89. Journaled on the bracket 88 is a spindle 90 carrying a pointer 91 adapted to excurse over the graduated scale 89 whereby there may be obtained a measure of the deflection of said pointer. Attached to the shaft 81 is a cam member 92 having its periphery conformed according to a predetermined law. An arm 93 attached to the spindle 90 carries a follower 94 adapted to bear upon the periphery of the cam 92, whereby the deflection of the pointer 91 with respect to the scale 89 will be a measure of the angular rotation of the shaft 81, and, therefore, of the vertical position of the reservoir 75 but with a relationship modified according to the law governing the conformation of the cam. With this arrangement, the vertical displacement of the reservoir 75 may be substantially unlimited and will be proportional to the angle of rotation of the shaft 87; and compensation for non-linear relationship between the displacement of the reservoir and the magnitude under measurement will be effected by the cam 92 in its coaction with the follower 94.

While the cam member 92 would ordinarily be conformed in accordance with a quadratic law to compensate for the characteristic of flow measurement by means of an orifice or its equivalent, it will be obvious that this member can be given any desired shape; and that various characteristic laws of measuring apparatus with which the device may be associated can be embodied in the conformation of different cam members; and by a selected one of these being substituted for the cam member 92 a uniform scale may be obtained, whatever the characteristic law of the measuring element.

Figure 6:
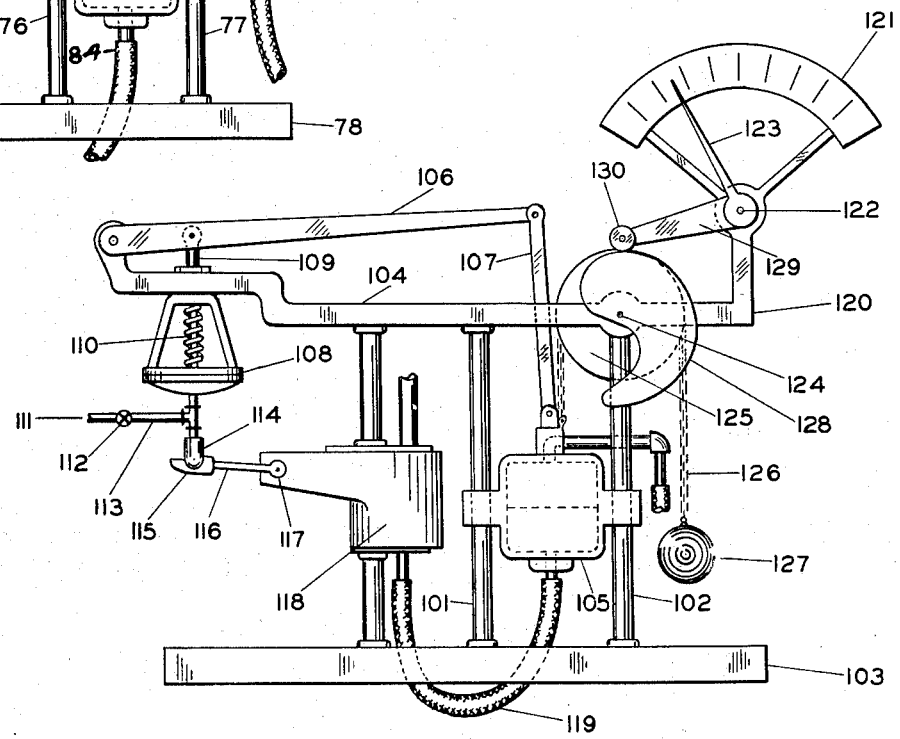

In Fig. 6 is shown a form of the invention in which the balancing action essential to the null method of measurement is carried out by a pneumatic, rather than an electric, servomotor. Two vertically disposed guide rods 101 and 102 are fixed at their lower ends to a base plate 103, and secured at their upper ends to a mounting plate 104. A reservoir 105 movable along said guide bars is adapted to be adjusted to different vertical positions by means of a lever arm 106 fulcrumed to the supporting plate 104 and attached to said reservoir by means of a link member 107.

Mounted upon the plate 104 is a pneumatic diaphragm valve operator 108 of the conventional form, having a movable rod element 109 adapted to be vertically displaced in opposition to the influence of a spring 110 when air pressure is applied to the valve operator 108. The rod 109 is pivotally attached to the lever arm 106 at a point near its fulcrum, so that as air pressure is applied to the valve operator 108, the reservoir 105 will be adjusted vertically along the guide rods 101, 102 and will assume a position corresponding to the pressure applied to the valve operator.

Compressed air is supplied from a source 111 through a constriction 112 and a conduit 113 to the valve operator 108. Attached to the conduit 113 is an orifice member 114 having co-operating therewith a vane member 115, the combination of orifice and vane constituting an escape valve. The orifice and vane combination may preferably take the form fully disclosed in United States Letters Patent No. 1,880,247, issued October 4, 1932, to Griggs and Mabey; but any device whereby the escape of air from a conduit to the outside atmosphere may be effectively controlled with a relatively small expenditure of power will serve the purposes of the invention. The vane 115 is carried by an arm 116 attached to a spindle 117 projecting from a stationary reservoir 118 and interiorly thereto connected to a movable float in a manner identical with the arrangement of the corresponding elements illustrated in Fig. 1. The lower portions of the reservoirs 105 and 118 are interconnected by means of a flexible conduit 119. The upper portions of said reservoirs are connected by suitable conduits to the sources of any two pressures whose differential it is desired to determine in the same manner as the corresponding elements of Fig. 1 are connected to the conduit 35 on opposite sides of the orifice 36 through which flows a liquid whose velocity it is desired to determine. The arrangements and connections of the conduit 113, the orifice 114 and the vane 115 are such that as the spindle 117 is rotated through a small angle in a counter-clockwise sense, corresponding to an increase in the elevation of the liquid within the reservoir 118, the obstruction provided by the vane 115 to escape of air through the orifice member 114 will be lessened, with a corresponding decrease in pressure of the air in the conduit 113 as supplied through the constriction 112, so that the link 109 in response to the influence of spring 110 will cause the lever arm 106 to be deflected and the reservoir 105 to be moved to a lower position.

Mounted upon a bracket 120 attached to the plate 104 is a graduated scale element 121. Journaled on the bracket 120 is a spindle 122 carrying a pointer 123 adapted to excurse over the graduated scale 121 whereby there may be attained a measure of the deflection of said pointer. Journaled upon the plate 104 is a shaft 124 carrying a sheave 125 disposed in such a manner that one extremity of its horizontal diameter will lie substantially above the center of the reservoir 105. A chain or equivalent flexible link 126 passes over the sheave 125 and is frictionally or otherwise engaged therewith and is maintained in a state of tension by means of a weight 127. Attached to the shaft 124 is a cam member 128 having its periphery conformed in a manner similar to the cam member 92 described in connection with Fig. 5. An arm 129 attached to the spindle 122 carries a follower 130 adapted to bear upon the periphery of the cam 128, whereby the deflection of the pointer 123, with respect to the scale 121, will be a measure of the angular rotation of the shaft 122, and therefore of the vertical position of the reservoir 105 but with a relationship modified according to the law governing the conformation of the cam.

The apparatus being connected as hereinbefore pointed out, so that an elevation of the liquid surface in the reservoir 118 will bring into effect influences tending to lower the reservoir 105. it will be obvious that upon any change in differential pressure applied to the liquid surfaces in the two reservoirs, the pneumatic servomotor or valve operator 108 will be caused to adjust the vertical position of the reservoir 105 in a sense to balance said change and maintain a fixed amount of liquid in each part of the U-tube system. The cam member 128, being operated directly from the reservoir 105 through coaction of the chain 126 and the sheave 125 will act through the follower arm 129 to deflect the pointer 123 and cause it to indicate upon the scale 121 a magnitude which is a function of the pressure differential applied to the reservoirs.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for producing an effect corresponding with a variable magnitude constituting a function of a differential pressure, said apparatus comprising a liquid type manometer adapted to respond to said differential pressure and having a fixed reservoir and a vertically movable reservoir, means responsive to vertical displacement of the surface of liquid in said fixed reservoir from a predetermined level for actuating said movable reservoir in a sense and to an extent to return said surface to said level, a movable element, and means for positioning said element as an incident to movement of said movable reservoir.

2. Apparatus as defined by claim 1, wherein the means for moving said element is operated by the movable reservoir.

3. Apparatus for producing an effect corresponding with a variable magnitude constituting a non-linear function of a differential pressure, said apparatus comprising a liquid type manometer adapted to respond to said differential pressure and having a fixed reservoir and a movable reservoir, motor means responsive to vertical displacement of the surface of liquid in said fixed reservoir from a predetermined level, means controlled by said motor means for actuating said movable reservoir in a sense and to an extent to return said surface to said level, a movable element, and means controlled by said motor means for imparting to said element movements proportional to changes in said magnitude.

4. Apparatus as defined by claim 3, wherein the means for moving said element includes the movable reservoir.

5. Apparatus for indicating values of a variable magnitude constituting a non-linear function of a differential pressure, said apparatus comprising a liquid type manometer adapted to respond to said differential pressure and having a fixed reservoir and a movable reservoir, motor means responsive to vertical displacement of the surface of liquid in said fixed reservoir from a predetermined level, means controlled by said motor means for actuating said movable reservoir in a sense and to an extent to return said surface to said level, indicating means, and means controlled by said motor means for imparting to said indicating means movements proportional to changes in said magnitude.

6. Apparatus for producing an effect corresponding with a variable magnitude constituting a function of a differential pressure, said apparatus comprising a liquid type manometer adapted to respond to said differential pressure and having a fixed reservoir and a movable reservoir, means responsive to vertical displacement of the surface of liquid in said fixed reservoir from a predetermined level, reversible motor means controlled by the first mentioned means for actuating said movable reservoir in a sense and to an extent to return said surface to said level, a movable element, and means for positioning said element as an incident to movement of said movable reservoir and in proportion to changes in said magnitude.

7. Apparatus for producing an effect corresponding with a variable magnitude constituting a function of a differential pressure, said apparatus comprising a liquid type manometer adapted to respond to said differential pressure and having a fixed reservoir and a movable reservoir, a pair of fixed contacts in said fixed reservoir adapted to coact with the surface of the liquid therein, means controlled by said contacts for actuating said movable reservoir in a sense to return said surface substantially to a predetermined level upon departure therefrom, a movable element, and means for positioning said element as an incident to movement of said movable reservoir and in proportion to changes in said magnitude.

8. Apparatus for producing an effect corresponding with a variable magnitude constituting a function of a differential pressure, said apparatus comprising a liquid type manometer adapted to respond to said differential pressure and having a fixed reservoir and a movable reservoir, fluid pressure means responsive to vertical displacement of the surface of liquid in said fixed reservoir from a predetermined level, means controlled by said fluid pressure means for actuating said movable reservoir in a sense and to an extent to return said surface to said level, a movable element, and means for positioning said element as an incident to movement of said movable reservoir and in proportion to changes in said magnitude.

9. In combination, a liquid type manometer adapted to respond to a differential pressure and having a fixed reservoir and a vertically moveable reservoir, and means responsive to vertical displacement of the surface of liquid in said fixed reservoir from a predetermined level for actuating said moveable reservoir in a sense and to an extent to return said surface to said level.

10. In combination, a liquid type manometer adapted to respond to a differential pressure and having a fixed reservoir and a vertically moveable reservoir, and means comprising a reversible motor responsive to vertical displacement of the surface of liquid in said fixed reservoir from a predetermined level for actuating said moveable reservoir in a sense and to an extent to return said surface to said level.

11. Apparatus for producing an effect corresponding with a variable magnitude constituting a function of a differential pressure, said apparatus comprising a liquid-type manometer adapted to respond to said differential pressure and having a fixed reservoir and a vertically moveable reservoir in communication therewith, means responsive to vertical displacement of the surface of liquid in said fixed reservoir from a predetermined level, mechanism actuated by said means for moving said movable reservoir in a sense and to an extent to return said surface to said level, a movable element, and means moved by said mechanism for positioning said element in proportion to changes in said magnitude.

12. Apparatus for producing an effect corresponding with a variable magnitude constituting a non-linear function of a differential pressure, said apparatus comprising a liquid type manometer adapted to respond to said differential pressure and having a fixed reservoir and a movable reservoir in communication therewith, means responsive to vertical displacement of the surface of liquid in said fixed reservoir from a predetermined level, mechanism actuated by said means for moving said movable reservoir in a sense and to an extent to return said surface to said level, a movable element, and means moved by said mechanism for positioning said element in proportion to changes in said magnitude.

13. In combination, a liquid type manometer adapted to respond to a differential pressure and having a fixed reservoir and a vertically moveable reservoir, means comprising a reversible motor responsive to vertical displacement of the surface of liquid in said fixed reservoir from a predetermined level for changing the position of said movable reservoir in a sense and to an extent to return said surface to said level, and means providing a measure of the changed level of said movable reservoir.

14. Apparatus for producing an effect corresponding with a variable magnitude constituting a non-linear function of a differential pressure, said apparatus comprising a liquid type manometer adapted to respond to said differential pressure and having a fixed reservoir and a movable reservoir, motor means responsive to vertical displacement of the surface of liquid in said fixed reservoir from a predetermined level, means controlled by said motor means for actuating said movable reservoir in a sense to return said surface to said level, a movable element, and means controlled by said motor means for imparting to said element movements proportional to changes in said magnitude, one of said means controlled by said motor means comprising a cam having a configuration conforming to the non-linear relation between said magnitude and said differential pressure.

15. Apparatus for producing an effect corresponding with a variable magnitude constituting a function of a differential pressure, said apparatus comprising a liquid type manometer adapted to respond to said differential pressure and having a fixed reservoir and a movable reservoir, a pair of relays, one of which is de-energized and the other energized when the surface of the liquid in said first reservoir is substantially at a predetermined level, connections for energizing the first relay when said surface departs from said level in one direction and for de-energizing the other relay when said surface departs from said level in the opposite direction, means comprising contacts controlled by said relays for actuating said movable reservoir in a sense to return said surface substantially to said predetermined level upon departure therefrom, a movable element, and means for positioning said element as an incident to movement of said movable reservoir and in proportion to changes in said magnitude.

JAMES R. HICKS.